Nov. 11, 1958  W. C. CORYELL  2,859,881
AUTOMOBILE CYLINDER HEAD HOIST
Filed Feb. 2, 1954

INVENTOR.
William C. Coryell
BY

United States Patent Office 2,859,881
Patented Nov. 11, 1958

2,859,881

AUTOMOBILE CYLINDER HEAD HOIST

William C. Coryell, Wayne, Nebr.

Application February 2, 1954, Serial No. 407,658

4 Claims. (Cl. 212—64)

This invention relates to hoists especially adapted for lifting cylinder heads from automobile engines during repair work, and more particularly it is an object of this invention to provide a hoist for this purpose which makes possible the perfect alignment of the present day, very heavy valve-in-head cylinder heads of V-8 engines with a minimum of manual effort and at a maximum speed.

Automobile cylinder heads on modern V-8 engines with the valves mounted in the head are extremely heavy. It is impossible to put these in position by hand. Because of this it is desirable to be able to move the hoist rather than the car in adjusting the position of the hoist relative to the engine to correctly align the cylinder head in the gasket. In my construction this can be easily done by shifting the base of the hoist nearer or farther from the wheel without moving the car. Such shifting can be done in very small amounts, inches and fractions of inches, when necessary.

No such adjustment concerning fractions of inches is possible without movable wedges.

A particular object resides in the provision of wedges in combination with foot portions of a hoist-base, the wedges being driven between the forward underside of the tire and an adjacent foot portion of the base and the rearward underside of the tire and the adjacent rearward foot portion of the base respectively, whereby the weight of the automobile presses downwardly on the wedges and base for holding the hoist in position with sufficient rigidity to permit the lifting of the head of the engine and the swinging of the head of the engine in an arc to move it outwardly from under the hood.

I am aware that the patent issued to F. T. Sila on November 4, 1952, titled "Vehicle Wheel Mounted Derrick," Patent No. 2,616,575 shows fixed inclined members which are in a very broad sense fixed wedges. However with such a construction the hoist cannot be moved inwardly and outwardly with respect to the side of the car to align the heavy cylinder head on its gaskets and in fact it is impossible to remove the hoist at all with respect to the side of the car whereby such a hoist cannot serve the purpose of efficient aligning of cylinder heads.

It is therefore an object of my invention to provide a hoist which can be easily shifted outwardly or inwardly with respect to the side of a car without moving the car and with the possibility of such shifting being done in both inches and even in fractions of inches to make possible perfect alignment of the cylinder head on the engine block without excess manual effort.

Yet a further advantage of the wedges described is in that they make it possible to adapt the combination to fitting wheels of various sizes including the various sizes of automobile wheels and truck wheels. I have found that a single set of wedges are sufficient for all automobile wheels and all truck wheels of types commonly encountered.

Heretofore, it has been a common practice to remove the hood of an automobile in order to remove the head of the engine. It is a particular object of my invention to provide a hoist so constructed as to make possible the placing of the arm of the hoist under the hood when the hood is in a raised position whereby the head can be removed without the necessity of removing the hood.

It is an objective in particular to provide a swinging arm particularly making possible the placing of the arm under the raised hood of an automobile. Heretofore, hoists have not had swinging arms for the reason that a swinging arm would upset hoists of the prior art of the types commonly used for this purpose. The earlier hoists have had the disadvantage of supporting bases adapted only for providing sufficient stability for one position of the hoist boom.

I am aware that the Sila patent, above mentioned, is so constructed as to make possible a swinging of the boom. However my invention is a hoist especially made for removing cylinder heads of engines and its height is substantially less than the Sila hoist whereby the boom can go under the hood as above described.

Overhead hoists have been used in substitution for boom hoists to great extent heretofore because the overhead hoist, mounted upon a track, can lift the cylinder head out with ease and move it to the side for lowering it again. However, overhead hoists have a great disadvantage in that the hood of the automobile must be removed to make possible their use.

The removing of the hood in all present day cars is a job of considerable size. Hoods on the modern car are provided with many sections and adjustments for balancing the hood whereby it can be maintained in an upper position when raised without constant holding. The assembly of parts necessary for balancing is sufficient in quantity that the removal of the hood is an expensive process.

Indeed the hoods are so difficult to remove on modern cars that in many cases a cylinder head can actually be removed at a lesser expense than the expense of removing and replacing a hood.

A further and particular advantage of my hoist is in that it is very undesirable to remove a hood as the removal and replacement disturbs the delicate balance thereof to the end that a hood may not work properly after it is replaced.

Yet another object of the invention is to provide a hoist for this purpose which is very light and easily carried and which is relatively compact for easy storage.

Still another object resides in the provision of a telescoping mast and a telescoping boom in such a hoist.

The most common way of removing and replacing the head of an engine has been by manual labor. Some men attempt to lift these heads manually and by themselves without assistance. It is possible for some men to accomplish this. However, it is one of the greatest of exertions and places great strain upon the back at times when the operator is bent over into an unnatural lifting position such that the weight being lifted has a great leverage adding to the weight factor in straining the back of the operator.

The manual lifting out of the head of an engine has been used extensively because the removal of the hood is so expensive and time consuming and because no hoists have been available at prices which are reasonable for this job.

Further complicating these factors is the popularity of the V type of engine with valve-in-head mechanisms. This type of a head is much heavier than those earlier used. In addition, this type of head is in a more inaccessible position and is extremely hard to lift out.

A further object of the invention is to provide the broad conception of means for cooperative engagement with both the feet of the base support portion of the crane and with the forward and rearward sides of the tire, the means being for the purpose of anchoring the supporting base of the crane to the tire in such a way as to use the weight of the automobile for the anchoring of the base.

A particular object of the invention is to provide means as above described and so constructed as to have the further advantage of blocking the wheel of the automobile so as to prevent it from moving forwardly or rearwardly.

Yet a further object of the invention is to provide a hoist for making it possible to handle and to replace the head of an engine with accuracy so as to avoid misalignment of the gasket which is a frequently occurring problem in repair of this sort.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

Figure 1:
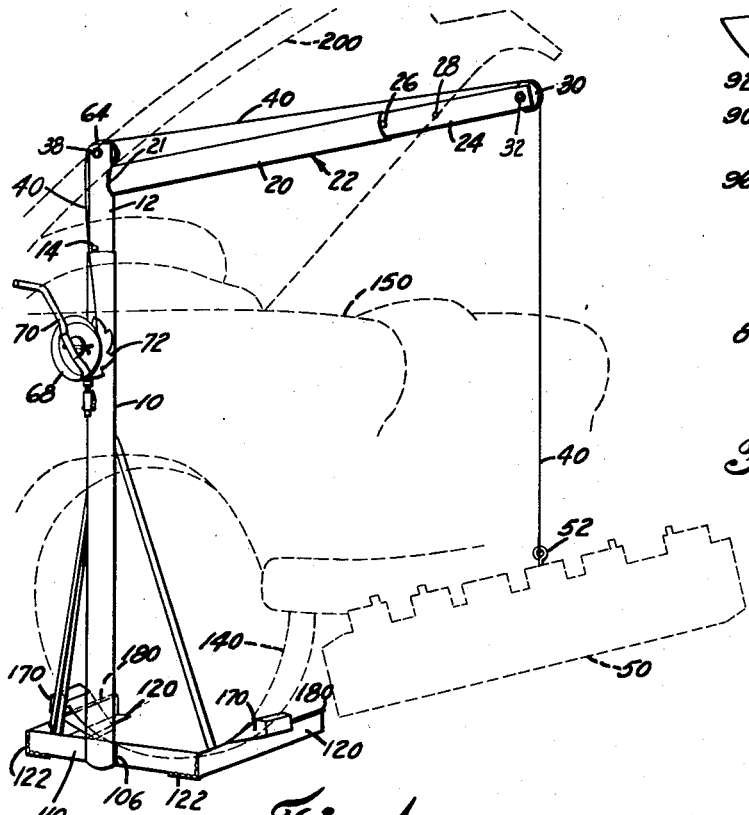
Figure 1 is a perspective view of the hoist shown attached to a cylinder head, the cylinder head and an automobile being shown in dotted lines.

The cylinder head hoist of this invention, as best seen in Figure 1, is provided with an upright mast, having two sections 10 and 12, the upper section 12 being telescopically received in the lower section 10.

Figure 2:
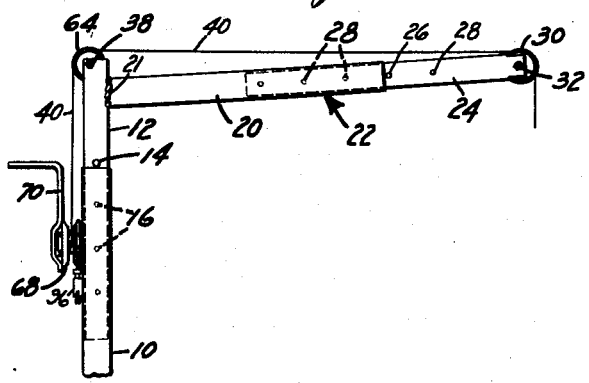
Figure 2 is a side elevation of the top portion of the hoist.
Figure 4:
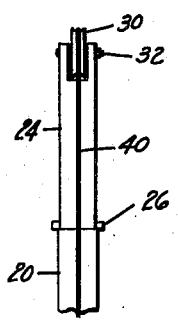
Figure 4 is a top plan view of the outer end of the horizontal arm of the hoist.

As best seen in Figure 2, a pin 14 or the like extends into any one of a plurality of vertically spaced apart apertures 16 in the upper mast section 12 for adjustably positioning the upper section with respect to the lower section.

An arm 20 extends transversely outwardly from the upper section 12 being secured thereto at 21 and the arm 20 can extend either horizontally or be slightly upwardly extending.

The arm 20 forms the inner portion of a boom generally indicated at 22, the outer portion of the boom 22 being an outer arm 24 telescopically received in the inner arm 20.

The positions of the arms 20 and 24 are regulated through the use of a pin 26 similar to the pin 14 and receivable in a plurality of horizontally spaced apart apertures 28 in the outer arm 24.

A pulley 30 is provided and is received in a notch in the outer end of the outer arm 24 mounted upon an axle bolt 32. A similar pulley is mounted in a similar slot in the upper end of the upper mast section 12 mounted upon a pin 38.

A cable 40 extends from a cylinder head 50 or other object to be lifted, being suitably secured thereto as by means of an eye bolt 52.

The cable 40 extends upwardly over the pulley 30 approximately horizontally across the pulley 64 at the top of the mast and then extends downwardly to the drum portion 68 of a winch having a handle 70. The winch is further provided with a ratchet wheel 72.

Figure 3:
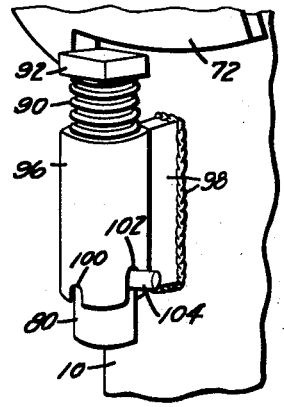
Figure 3 is a detail showing a construction of a releasable pawl.

As best seen in Figure 3, the winch is provided with a pawl 80 in the form of a vertically disposed bolt, the head of which engages the teeth of the ratchet wheel 72, being urged upwardly by a coil spring 90 disposed beneath the head 92 of the bolt 80.

The spring 90 is disposed between the head 72 and a holder 96, which latter slidably receives the shank of the bolt 80 and is itself attached by suitable means 98 to the side of the mast section 10.

The lower end of the holder 96 is provided with suitable notches 100 and 102 therein for receiving a pin 104 which is transversely disposed with respect to the shank 80 of the bolt and is fixed to the shank in such a way that the operator can move the pin 104 from the aperture 102, which extends further upwardly into the holder 96, to the aperture 100, in this way causing the bolt 80 to remain in a downwardly retracted position in which it is out of engagement with the ratchet wheel 72 at desired times.

When the pin 104 is in the longest aperture 102, the bolt 80 is free to engage the ratchet wheel 72 and to prevent movement of the ratchet wheel 72 in one direction only, to prevent unwinding.

The lower end of the mast 10 is attached suitably at 106 to a transverse base member 110 preferably formed of angle iron.

The member 110 is horizontally disposed and is attached to horizontal feet members 120 which extend inwardly therefrom being secured thereto at 122. The feet members 120 are preferably also of angle iron and are disposed in parallelism, being spaced apart a distance somewhat less than the full diameter of a wheel 140 of an automobile 150 whereas the feet 120 are received under the wheel 140 but are normally spaced therefrom slightly.

Into the space between the upper sides of the angle iron feet 120 and the outer edges of the tire 140, wedges 170 are driven so as to press the feet 120 firmly against the floor, or against the ground as the case may be.

The wedges 170 are of wedge shape and are preferably of a considerable width for giving a good hold.

The upper edges of the angle iron feet 120 are preferably outwardly turned as shown at 180 so as to provide a flat surface for protecting the outer edge of the tire and for providing a good surface on which to drive the wedges.

As best seen in Figure 1, the hood 200 of the automobile can be raised to a height such that the boom 22 of the hoist can be swung thereunder. Although cars are of varying height, the mast sections 10 and 12 can be adjusted.

It will be seen that when the hoist is in place, the cylinder head can be easily removed and that the weight of the car provides such stability that the boom 22 of the hoist can be swung outwardly with the cylinder head on it without danger of upsetting the hoist.

The hoist freely rotates with the upper portion 12 of the mast turning in the lower portion 10 and is conveniently adjustable on both the mast and boom.

It will be seen that the telescoping relationship of the upper portion 12 of the mast in the lower portion 10 of the mast provides a very simple and economical way of attaining both rotating motion of the upper part with respect to the lower part as well as a vertical extensibility, and particularly with an amount of support for the upper part which is sufficient even though attained by the telescoping relationship only.

It will be seen that this invention fulfills the objects above described.

From the foregoing description it is thought to be obvious that an automobile cylinder head hoist, constructed in accordance with my invention is particularly well adapted for use, by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed:

I claim:
1. In a hoist for use in conjunction with wheeled vehicles, an upright mast, a boom means secured to and extending outwardly from said upright mast, a base portion attached to the bottom of said upright mast having two spaced apart feet horizontally outwardly protruding, whereby an open space exists between said feet, said feet being spaced apart sufficiently for the reception of a wheel of said vehicle between said feet, whereby at times when said vehicle is supported by a substantially horizontal surface, the base of said hoist while supported by said surface can be pushed under said wheel with one of said feet on a forward side and one on a rearward side of said wheel, and means disposed between at least one of said feet and said wheel releasably pressing against said wheel and said one foot whereby a portion of the weight of said car is caused to exert a force downwardly against said feet for providing the base of said hoist with stability.

2. The hoist described in claim 1 in which said means includes at least one wedge removably disposed between the upper edge of said one foot and the adjacent surface of said wheel.

3. The combination described in claim 1 in which at least one of said feet has an upright portion adjacent the circumference of said wheel, and said one foot having a transverse portion extending along the top thereof adjacent said wheel, and in further combination with a wedge insertable between said transverse portion and an adjacent surface of said wheel, and serving as said pressing means.

4. The combination described in claim 1 wherein said upright mast comprises an elongated tubular lower portion and an elongated upper portion slidably received within said tubular lower portion, said upper portion having spaced apart diametrical apertures therein, a pin insertable in a selected one of said apertures and of a sufficient length so that its ends extend beyond the sides of the said upper portion to rest and turn on the upper end of said tubular lower portion, and wherein said boom comprises an inner tubular portion connected to and extending outwardly from said elongated upper portion of said upright mast, and an elongated outer portion slidably received within said inner tubular portion, said elongated outer portion having spaced apart diametrical apertures therein, a pin insertable in a selected one of said apertures and of a sufficient length so that its ends extend beyond the sides of said elongated outer portion to abut against and turn on the outer end of said inner tubular portion.

References Cited in the file of this patent
UNITED STATES PATENTS

| | | |
|---|---|---|
| 242,124 | French | May 31, 1881 |
| 385,655 | Archer | July 3, 1888 |
| 859,146 | Stewart | July 2, 1907 |
| 1,354,501 | Manley | Oct. 5, 1920 |
| 2,142,379 | Sharkey | Jan. 3, 1939 |
| 2,615,584 | Adams | Oct. 28, 1952 |
| 2,616,575 | Sila | Nov. 4, 1952 |